US008197958B2

(12) United States Patent
Gaben et al.

(10) Patent No.: US 8,197,958 B2
(45) Date of Patent: Jun. 12, 2012

(54) ELECTRIC BATTERY COMPRISING A MECHANICAL AND THERMAL CONDITIONING SYSTEM

(75) Inventors: Fabien Gaben, Courbevoie (FR); Claude Beignet, Meudon (FR); Alain Douarre, Gif sur Yvette (FR)

(73) Assignee: Dow Kokam France SAS, Massy (FR)

( * ) Notice: Subject to any disclaimer, the term of this patent is extended or adjusted under 35 U.S.C. 154(b) by 426 days.

(21) Appl. No.: 12/514,635

(22) PCT Filed: Oct. 19, 2007

(86) PCT No.: PCT/FR2007/001734
§ 371 (c)(1),
(2), (4) Date: Jul. 16, 2009

(87) PCT Pub. No.: WO2008/059123
PCT Pub. Date: May 22, 2008

(65) Prior Publication Data
US 2010/0119926 A1 May 13, 2010

(30) Foreign Application Priority Data

Nov. 14, 2006 (FR) .................................. 06 09949

(51) Int. Cl.
*H01M 10/50* (2006.01)
(52) U.S. Cl. ....................................................... 429/120
(58) Field of Classification Search .................. 429/120
See application file for complete search history.

(56) References Cited

U.S. PATENT DOCUMENTS

| 4,707,420 | A | * | 11/1987 | Wedlake | .................... | 429/11 |
| 5,866,276 | A | * | 2/1999 | Ogami et al. | .................... | 429/120 |
| 5,985,483 | A |   | 11/1999 | Verhoog et al. | | |
| 6,007,937 | A | * | 12/1999 | Ruiz Rodriguez et al. | ..... | 429/94 |
| 6,087,038 | A | * | 7/2000 | Flament et al. | .................... | 429/120 |
| 6,296,968 | B1 |  | 10/2001 | Verhoog | | |
| 6,444,353 | B1 | * | 9/2002 | Takaki et al. | .................... | 429/120 |
| 6,569,561 | B1 | * | 5/2003 | Kimura et al. | .................... | 429/159 |
| 2007/0212598 | A1 | * | 9/2007 | Iida et al. | .................... | 429/62 |
| 2011/0318618 | A1 |  | 12/2011 | Yajima et al. | | |

FOREIGN PATENT DOCUMENTS

| EP | 0902494 A1 | 3/1999 |
| EP | 0933830 A1 | 8/1999 |
| EP | 0964460 A1 | 12/1999 |
| JP | 61110972 A | 5/1986 |

OTHER PUBLICATIONS

International Search Report dated Apr. 24, 2008.

* cited by examiner

*Primary Examiner* — Jerry Lorengo
*Assistant Examiner* — Carlos Barcena
(74) *Attorney, Agent, or Firm* — Harness, Dickey & Pierce, P.L.C.

(57) ABSTRACT

An electric battery includes a plurality of electric energy generators and a system for mechanical and thermal conditioning of the elements, which system includes a one-piece structural body in which housings are formed in order to each receive an element, in which the housings have at least one internal area of contact with an element, and the contact area is continuous and has a shape suitable for ensuring contact between the area and the periphery of the element, in which the body also includes chambers that each extend around a contact area, and which system also includes a device enabling a thermal conditioning fluid to circulate in the chambers so as to ensure the thermal conditioning of the elements.

15 Claims, 2 Drawing Sheets

ELECTRIC BATTERY COMPRISING A MECHANICAL AND THERMAL CONDITIONING SYSTEM

BACKGROUND (1) Field of the Invention

The invention relates to an electric battery that is intended in particular for the front-wheel drive of an electric motor vehicle or a hybrid motor vehicle, i.e. including an electric engine powering the drive wheels combined with a thermal engine powering the same or possibly other drive wheels.

(2) Prior Art

To ensure the required power and energy levels for electric or hybrid vehicle applications, it is necessary to create batteries including a plurality of electric energy generating elements.

When these elements are charged and discharged, heat is produced, which, when it is not controlled, can decrease the lifetime of the elements, and even, under extreme conditions, present risks of thermal runaway for certain chemical compositions of elements, leading to deterioration of the battery.

The energy that a battery is capable of providing is dependent on the energy balance of the various elements as well as their operating temperatures. Indeed, the energy that can be generated by an element increases with the temperature, and when there are differences in energy levels available in each of the elements, for a single battery, then the battery is said to be unbalanced. This imbalance strongly affects the performance of the battery in terms of both lifetime and average energy density, because the total energy that can be generated by a battery is always limited by the energy of the element with the lowest charge, and the total energy is moreover limited by the element with the highest charge.

These differences in energy level between the elements, causing the imbalance, can be due either to differences between the electric properties of the elements or to variations in the operating temperatures of the elements. When one element of a battery has a lower charge than the others, a risk of inversion may appear for low charge states.

Furthermore, the chemical compositions of lithium-ion batteries are more or less stable. When they are activated under extreme conditions, thermal runaway can appear. For large batteries that are necessary for predominantly electric vehicles, this risk is critical, because if the thermal runaway of an element spreads to the entire battery, the energy involved by this runaway becomes very high.

To optimize the performance and lifetime of batteries, systems for thermal conditioning of elements have therefore been integrated in the batteries.

In particular, cooling systems have been proposed, which use air circulation as a heat sink. While numerous efforts have been made to ensure the most uniform temperature possible by these means within the battery, it remains that such system do not uniformly cool the power-activated battery elements, as is the case in particular in applications intended for plug-in electric and hybrid vehicles.

The thermal dissipation peaks are very high and are dependent on the current densities and the variations thereof, which, for specific applications, can reach very high values, in particular during phases of high accelerations, regenerative brakings, rapid recharging of the battery, or highway operation in electric mode.

For such conditions of use, the air flow rates necessary to cool the battery elements can be reached only by providing significant space between the elements.

These high flow rates serve to compensate for the low heat transfer coefficients of the air flows over the battery elements, and lead to acoustic and vibration problems. The fans necessary for ensuring the flow rates enabling the batteries to be cooled uniformly and effectively then have sizes that are unsuitable for the requirements of compactness and energy savings of the electric vehicle application.

To improve the efficacy of the cooling, and simultaneously enable the volume energy density of the batteries to be increased, the circulation of a liquid has been proposed. In particular, the liquid can be provided in order to circulate through plastic cells that are arranged between the battery elements. These cells are insulating and contribute to the electrical insulation between elements.

However, the plastic pouches in which these cells are formed are poor thermal conductors, so they must have the lowest thickness possible to ensure the proper heat transfers. This results in an unsuitability of the fine walls for the mechanical strength of the battery elements.

Moreover, in the electric or hybrid vehicle application, the batteries according to the prior art present a certain number of problems, in particular due to the increase in the degree of hybridization of thermal vehicles, which can be a complete electrification of the front-wheel drive chain. In this case, the batteries no longer serve solely to assist the vehicles in acceleration phases, but also ensure the autonomous movement of the vehicle over substantial distances.

It is then necessary to increase the electric power of the batteries, which increases the battery activation times, as well as the currents and the average internal resistance. Thus, the energy and the thermal power emitted increase, and all the more so as the battery ages.

The cost of a battery is dependent primarily on the number of elements that it contains, or in other words, on its energy. Also, to reduce the impact of the cost of batteries in a vehicle, it is sought to use said batteries over the broadest possible potential range so as to extract the maximum amount of energy therefrom.

As one gets closer to the extreme potential values allowed, the internal resistance of the elements increases, and their lifetimes decrease.

The high powers required lead to significant and rapid heating of the battery elements, which can cause temperature gradients between the surface and the interior thereof, and even between elements in the same battery.

These temperature gradients essentially appear during the transient phases corresponding to high current surges, during charging or discharging.

The increase in temperature within a battery element leads to risks in terms of safety and lifetime, associated with the possible presence of hot spots at the core of the element.

Battery safety is also becoming more critical with the increase in energy of batteries, and the plastic cells generally used to circulate a coolant between the elements are capable of breaking under impacts such as those that occur in a vehicle crash, or by overpressure generated at the level of the cooling circuit.

Such breakages then make the cooling system entirely inoperative, but even worse, the liquid is capable of causing a short circuit of all of the battery elements, thus creating a real risk of fire, and even explosion.

SUMMARY OF THE INVENTION

This invention is therefore intended to improve the existing electric batteries by proposing a mechanical and thermal conditioning system that enables the ratio between the volume and the energy and/or power to be substantially improved, as well as the lifetime and the safety of the battery in terms of both the chemical behavior and the constraints in effect in the automobile industry, in particular those concerning crashes.

The invention enables the compactness levels of the system to be achieved while satisfying the requirements of volume energy and power density compatible with the requirements of the automobile application, at a lower cost and weight.

Moreover, the low heat transfer resistances possible with the invention enable cooling of the battery to be ensured in spite of the very high level of compactness. The invention also enables the temperature within the element to be reduced during current surges, and prevents any risk of direct electric contact of the elements in the event of impact, which presents an advantage in terms of battery safety.

Finally, the efficacy of the thermal management enables the electrical consumption to be reduced, and therefore more autonomy to be provided for the electric vehicle.

To this end, the invention proposes an electric battery including a plurality of electric energy generators and a system for mechanical and thermal conditioning of said elements, which system includes a one-piece structural body in which housings are formed in order to each receive an element, in which said housings have at least one internal area of contact with an element, and said contact area is continuous and has a shape suitable for ensuring contact between said area and the periphery of said element, in which said body also includes chambers that each extend around a contact area, and which system also includes a device enabling a thermal conditioning fluid to circulate in said chambers so as to ensure the thermal conditioning of said elements.

BRIEF DESCRIPTION OF THE DRAWINGS

Other special features and advantages of the invention will appear in the following description, in reference to the appended figures, in which.

DETAILED DESCRIPTION OF THE PREFERRED EMBODIMENT(S)

Figure 1:
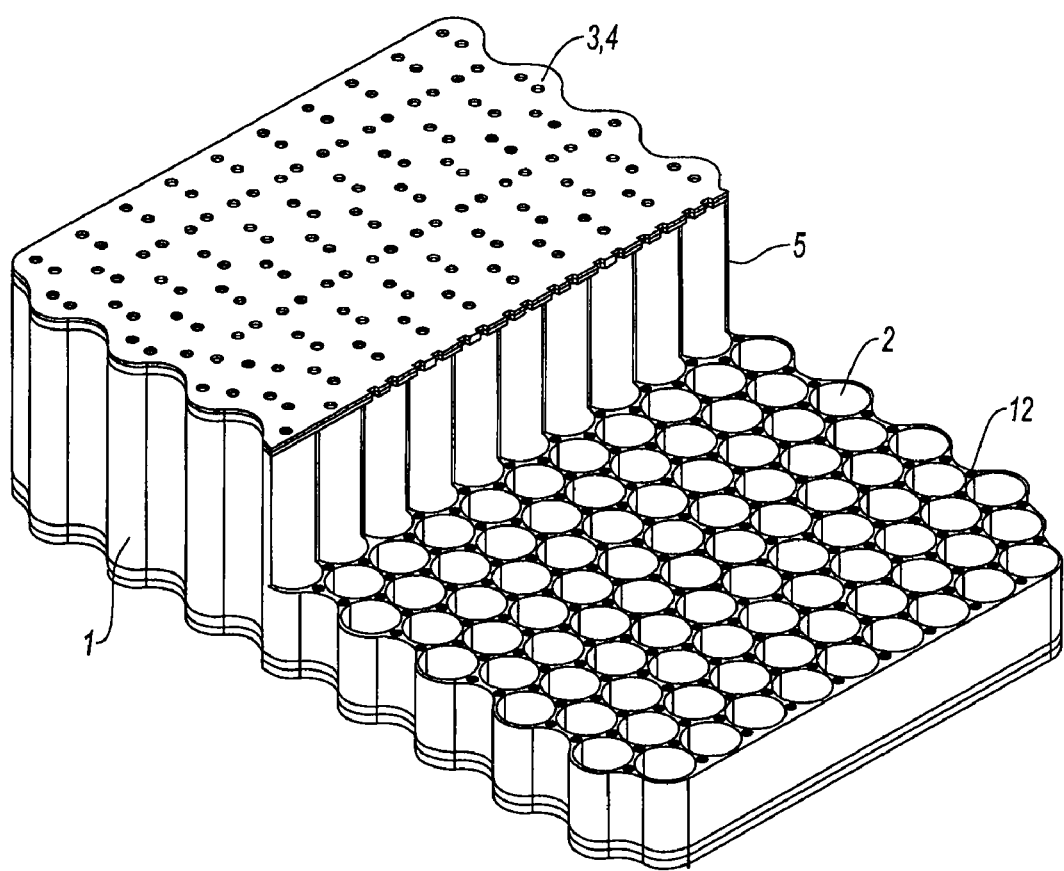
FIG. 1 is a perspective view of an electric battery in which the electricity generating elements are not shown, in which said view is partially cutaway in a transversal plane so as to show the arrangement and the inside of the housings.
Figure 2:
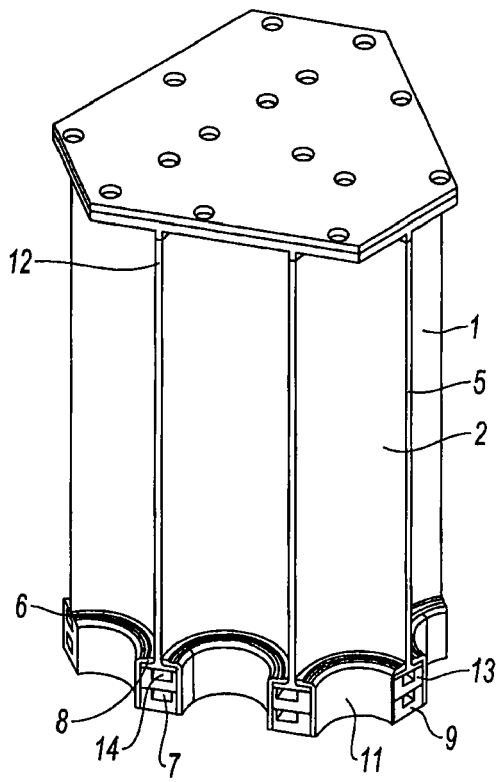
FIG. 2 is a perspective view of a longitudinal cross-section of the battery of FIG. 1.
Figure 3:
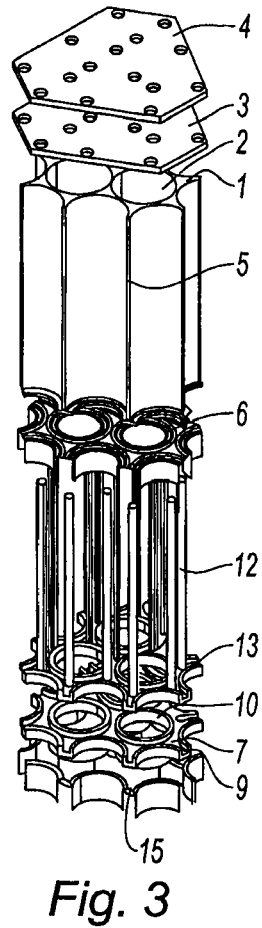
FIG. 3 is a longitudinal exploded view of the part shown in FIG. 2.
Figure 4:
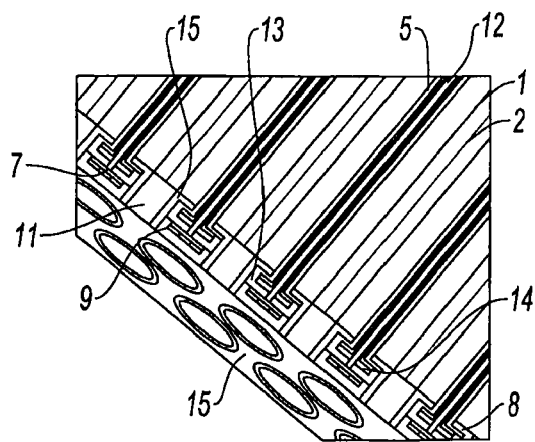
FIG. 4 is a partial longitudinal cross-section showing the bottom of the battery of FIG. 1 in perspective.

In the description, the terms of positioning in space refer to the position of the battery shown in FIG. 1. However, the imperviousness of the battery enables its positioning in a different direction to be envisaged.

In relation to the figures, we will describe below an electric battery including a plurality of electric energy generating elements (not shown in the figures). In particular, the elements can be electrochemical, for example lithium-ion. For this, the elements include a casing in which the electrochemical system is confined n order to insulate the chemical components necessary for generating electricity. Alternatively, the elements can be supercapacitors.

The battery is more specifically intended to power an electric front-wheel drive of a motor vehicle, whether an electric or an electric-thermal hybrid vehicle. However, the battery according to the invention can also be used to store electrical energy for other modes of transport, in particular in aeronautics.

To ensure the necessary electrical power supply, the battery includes a large number of elements, for example 160 elements distributed in 16 rows of 10 elements in the embodiment shown.

The battery includes a system for mechanical and thermal conditioning of the elements, which system enables the elements to be thermally conditioned as well as held in a reinforcing structure. Thus, the system ensures the electrical safety of the battery with respect to temperature-related risks, the operation of the battery in an optimal temperature range as well as the safety with regard to crash risks, which are inherent to the application considered.

To do this, the conditioning system includes a one-piece structural body 1 in which housings 2 are formed so as each to receive elements. By structural, we mean that the body 1 ensures the mechanical strength of the elements with respect to one another, in particular relative to crash test constraints in effect in the automobile industry, but also relative to the other forms of mechanical loads to which the battery may be subjected in an automobile. Moreover, as will be indicated later, the body 1 ensures a heat transfer function between the elements and a thermo-regulated fluid. Consequently, the thermal and mechanical conditioning functions of the elements are performed by means of a single one-piece body 1.

In the embodiment shown, the housings 2 extend vertically and have an internal cylindrical shape so as to receive elements with a corresponding external shape. In addition, the housings 2 are arranged in a compact hexagonal arrangement, enabling the bulk as well as the mechanical resistance of the battery to be optimized.

In other embodiments not shown, the housings can have an internal shape suitable for receiving elements with a different shape, for example with an external parallelepiped shape.

In general, the number of elements is equal to the number of housings 2. However, for a single unit, the battery power can be modulated by adjusting the number of elements. Thus, for certain applications, the number of elements is smaller than the number of housings 2 since the battery can include empty housings 2.

The body 1 is made of a material with high rigidity and good thermal conductivity, in particular a metal material, so as to benefit from a structural thermal conductor between the elements. The body 1 can be produced by casting in one piece with the housings 2, and said body can be made of aluminum, which offers a good compromise between weight, thermal and mechanical performances as well as industrial feasibility. In addition, the battery can include a tray (not shown), in particular made of plastic, in which the body 1 is placed for implantation in the motor vehicle.

The housings 2 are open in the upper portion so as to enable elements to be introduced, in which said openings are closed by an upper shell 3, 4. In addition, the battery includes means for electrical interconnection of the elements and means for electronic control of the electrical energy (not shown). These means can, for example be arranged on the upper portion of the body, in particular on a plate 3, 4, respectively, stacked in order to form the upper shell.

The housings 2 have an internal area of contact with the element, and said area is continuous and has a shape suitable for ensuring contact between said area and the periphery of said element. In the embodiment shown, the area of contact is formed over a height of the internal cylindrical wall of the housing 2, which area has a diameter slightly greater than the external diameter of the element.

According to the external shape of the element, it is possible to have a different shape and/or number of internal contact area(s) for the housing 2. In every case, the contact area is arranged so as to enable a good transfer of heat between the element and the housing 2.

Advantageously, the contact areas have a height substantially equal to that of the periphery of the element, so as to ensure the transfer of heat over the entire height of said element.

The body 2 also includes chambers 5 that each extend all around a contact area, i.e. cylindrical chambers in the embodiment shown. In addition, the chambers 5 communicate laterally with one another, and said chambers are open at the base of the body and closed at the upper portion.

The conditioning system includes a device that enables a thermal conditioning fluid to circulate in said chambers so as to ensure the thermal conditioning of the elements. The fluid can be glycol water, and the thermal conditioning means both the supply and removal of heat energy so as to keep the elements within an optimal operating temperature range.

In the embodiment shown, the chambers 5 form a network all around the housings 2 in which the fluid can circulate so as to thermally condition the elements. The conditioning system enables heat energy to be rapidly and effectively provided to or removed from the battery, so as to ensure thermal regulation regardless of the conditions of use.

To improve the thermal conditioning, the chambers 5 have a height substantially equal to that of the contact areas. However, a height of the chambers 5 that is lower than that of the contact areas can also be envisaged. Thus, associated with the fact that said chambers are arranged all around the contact area and that said area extends over the entire height of the element, the conditioning can be performed uniformly over the entire periphery of the element, thereby reducing the likelihood of the appearance of a dangerous hot spot in said element. In particular, this embodiment enables excessive temperature gradients to be avoided in phases of high current loads, long duration and/or over a broad potential range.

If the body 1 is made of an electrically conductive material, to improve the electrical safety of the battery in particular with regard to short circuits, the invention involves interposing a continuous electrical insulation film (not shown) between the contact area and the periphery of the elements so as to ensure contact through said film.

Advantageously, the film can be a good thermal conductor, or at least be thin enough not to degrade the thermal transfers between the elements and the body 1. Thus, the thermal transfer resistance is reduced, in association with a thermal exchange structure that, aside from its structural nature, has a good capacity for heat transfer between the elements and the conditioning fluid. This embodiment therefore enables one to do without the thermally insulating interface between the conditioning fluid and the elements, in a compact and mechanically resistant environment.

According to one embodiment, the insulating material also has adhesive properties between the body 1 and the elements so as to improve the mechanical cohesion of the battery. In particular, in the event of an impact, the elements are held in the body and protected by it from crushing. Alternatively, the material can be formed by a film of electrically insulating and thermally conductive oil or grease.

The electrical insulation of the elements with respect to the body 1 is also conferred by the fact that the elements rest on a ring 6 made of a dielectric material, in which a ring 6 is arranged in the base of each housing 2.

Below, we will describe a device enabling the circulation of the fluid, which includes a fluid bed 7, in which said bed is provided on the base of the body 1 so as to supply the chambers 5 with fluid by means of their opening 8 provided in the bottom portion of said body. To do this, the device includes a pump (not shown), which enables pressurized fluid to be brought into a closed fluid circulation circuit.

The fluid bed 7 is formed between the body 1 and a lower plate 9, for example made of molded plastic, which is assembled on the base of the body 1. The plate 9 is arranged so as to form fluid supply channels from the bed 7 to the chambers 5. More specifically, the plate 9 includes openings 10 arranged opposite lower openings 8 of the housings 2, and said openings are formed as an upward projection with respect to the plate 9 so as to form a fluid container between them.

The lower plate 9 also includes ascending capillaries 12, which communicate with the fluid bed 7. A capillary 12 is introduced into each chamber 5 so as to form a fluid supply channel of said chamber.

In the embodiment shown, the device for circulating the fluid also includes an upper plate 13 that is interposed between the base of the body 1 and the lower plate 9. The upper plate 13 is arranged to form a circuit 14 for recover of the fluid coming from the chambers 5. To do this, the upper plate 13 has a shape similar to that of the lower plate 9, and said plates are superimposed one over the other at the base of the body 1.

Thus, the fluid bed 7 is formed between the two plates 9, 13 and the fluid recovery circuit 14 is formed between the upper plate 13 and the base of the body 1. The fact of having the fluid bed 7 and the recovery circuit 14 arranged in the base of the body 1 enables the risks of short circuit by a fluid leakage between the elements to be significantly reduced.

In other embodiments not shown, the device for circulating the fluid can include a fluid bed without a separate recovery circuit, for example a fluid bed formed between a plate and the base of the body 1, in which said plate can also be free of capillaries. In every case, the presence of a fluid bed 7 common to all of the chambers 5 enables the head losses to be reduced, in particular for a large number of elements and therefore chambers 5.

In addition, the capillaries 12 pass imperviously through the upper plate 13 so as to communicate with the fluid bed 7. Thus, by applying a pressure on the fluid, it rises in the capillary 12, from the fluid bed 7 into the chamber 5, through the upper plate 13.

Then, the fluid leaves the capillary 12 and goes back down by flowing over the wall of the chamber 5 that is arranged opposite the surface of contact with the elements. At the base of the chamber 5, the fluid falls into the upper plate 13 so as to be capable of returning in a closed circuit to the fluid bed 7 by means of the recovery circuit 14.

Thus, excellent temperature uniformity in the battery enables the level of balance between the elements to be increased and enables the battery to be thermally regulated with high precision so as to minimize the internal resistances of the elements without detrimentally affecting their lifetime. The optimization of the thermal management then enables the energy and power of the battery to be increased, without having to add additional elements.

In addition, the conditioning system enables dissipation of the thermal energy from the thermal runaway of an element, without this excess of heat being transferred to the adjacent elements. This role of thermal confinement enables the risks of thermal runaway to be prevented from spreading to the entire battery, which is very critical for high-energy batteries.

Advantageously, the capillaries 12 have a thickness and a height lower than those of the chambers 5 so as to enable the fluid to be released in the upper portion of said chambers. This therefore results in an increase in the contact surface between the fluid and the wall of the chamber 5, which contributes to improving the efficacy of the thermal conditioning provided. In addition, the height of the capillaries 12 can be just below that of the chambers 5 so as to limit the longitudinal thermal gradient in the elements.

To radially hold the capillaries 12 in the chambers 5 and thus prevent the vibrations induced during fluid circulation, the periphery of the capillaries 12 can be provided with flanges (not shown) that are in contact with the wall of the chamber 5.

The plates 9, 13 are associated with the body 1 by means of rivets 15 that are attached respectively to the periphery of a through-hole that is formed in the base of each housing 2 by superimposing the opening 11 at the base of the housing 2 with the orifices 10 of the plates 9, 13, which are arranged opposite. Thus, the rivet 15 rests on the structural body 1 and holds the plates 9, 13 in a sealed manner on the base of the body 1.

In addition, the through-holes enable the escape of gases that may be emitted by the elements if they are uncapped due to an overpressure of the elements. In this case, and when an impervious tray is provided around the battery, it is equipped with a gas discharge valve. A gas emission or moisture detector can also be added to the battery.

The invention claimed is:

1. An electric battery comprising:
   a plurality of electric energy generating elements;
   a plurality of housings respectively receiving one said elements and being in contact with a periphery of said elements;
   a plurality of chambers extending around said plurality of housings; and
   a plurality of capillaries extending into said plurality of chambers and operable to communicate a thermal conditioning fluid into said chambers from a fluid bed, said plurality of capillaries each including a height lower than a height of said plurality of chambers to allow said thermal conditioning fluid to be released in an upper portion of each of said plurality of chambers.

2. Electric battery including a plurality of electric energy generators and a system for mechanical and thermal conditioning of a plurality of elements, which system includes a one-piece structural body in which housings are formed, each said housing receiving one said elements, said housings having at least one internal area of contact with said one element, and said at least one internal contact area being continuous and having a shape suitable for ensuring contact between said at least one internal contact area and a periphery of said one element, said body also including chambers that each extend around said at least one internal contact area, and which system also includes a device enabling a thermal conditioning fluid to circulate in said chambers so as to ensure thermal conditioning of said elements;
   wherein the chambers communicate laterally with one another, and said chambers are open at a base of the body and closed at an upper portion;
   wherein the device enabling circulation of the fluid includes a fluid bed that is provided on the base of the body so as to supply the chambers with fluid;
   wherein the fluid bed is formed between the body and a lower plate, which is assembled on the base of the body and said lower plate is arranged to form fluid supply channels from the fluid bed to the chambers;
   wherein the lower plate also includes ascending capillaries that communicate with the fluid bed and are introduced into respective ones of said chambers so as to form a channel for supplying fluid to said chambers; and
   wherein the capillaries have a thickness and a height lower than those of the chambers so as to enable the fluid to be released in the upper portions of said chambers.

3. Electric battery according to claim 2, wherein the contact areas have a height substantially equal to that of a periphery of the one element.

4. Electric battery according to claim 2, wherein the chambers have a height below or equal to that of the contact areas.

5. Electric battery according to claim 2, wherein the body is made of a metal material, with a continuous insulation film being interposed between the at least one internal contact area and a periphery of the elements so as to ensure contact through said film.

6. Electric battery according to claim 5, wherein the insulating material also has properties of adhesion between the body and the elements.

7. Electric battery according to claim 5, wherein the elements rest on an electrical insulation ring and said ring is arranged at a base of each said housing.

8. Electric battery according to claim 2, wherein a periphery of the capillaries is provided with flanges that are in contact with a wall of one of the chambers so as to ensure radial holding of said capillaries in said chambers.

9. Electric battery according to claim 2, wherein the device for circulating the fluid also includes an upper plate which is interposed between the base of the body and the lower plate and wherein said upper plate is arranged so as to form a circuit for recovering the fluid from said chambers.

10. Electric battery according to claim 9, wherein a through-hole is formed in the base of each said housing.

11. Electric battery according to claim 10, wherein the upper and lower plates are associated with the body by means of rivets that are respectively attached to a periphery of the through-hole.

12. Electric battery according to any claim 2, wherein the housings are open in an upper portion so as to enable elements to be introduced, and wherein openings in the housings are closed by an upper shell.

13. Electric battery according to claim 2, wherein the housings have a cylindrical shape and a compact hexagonal arrangement.

14. Electric battery according to claim 2, wherein the number of elements is less than or equal to the number of housings.

15. Electric battery including a plurality of electric energy generators and a system for mechanical and thermal conditioning of a plurality of elements, which system includes a one-piece structural body in which housings are formed, each said housing receiving one said elements, said housings having at least one internal area of contact with said one element, and said at least one internal contact area being continuous and having a shape suitable for ensuring contact between said at least one internal contact area and a periphery of said one element, said body also including chambers that each extend around said at least one internal contact area, and which system also includes a device enabling a thermal conditioning fluid to circulate in said chambers so as to ensure thermal conditioning of said elements;
   wherein the chambers communicate laterally with one another, and said chambers are open at a base of the body and closed at an upper portion;
   wherein the device enabling circulation of the fluid includes a fluid bed that is provided on the base of the body so as to supply the chambers with fluid;

wherein the fluid bed is formed between the body and a lower plate, which is assembled on the base of the body and said lower plate is arranged to form fluid supply channels from the fluid bed to the chambers;

wherein the device for circulating the fluid also includes an upper plate which is interposed between the base of the body and the lower plate and wherein said upper plate is arranged so as to form a circuit for recovering the fluid from said chambers;

wherein a through-hole is formed in the base of each said housing; and wherein the upper and lower plates are associated with the body by means of rivets that are respectively attached to a periphery of the through-hole.

* * * * *